United States Patent [19]

Kumashiro et al.

[11] Patent Number: 5,721,624
[45] Date of Patent: Feb. 24, 1998

[54] IMAGE READING APPARATUS IMPROVING THE JOINING STATE OF A PLURALITY OF IMAGE DATA OBTAINED BY DIVIDING AND READING OUT AN ORIGINAL IMAGE

[75] Inventors: Hideo Kumashiro; Kazuomi Sakatani; Sou Hirota, all of Toyokawa, Japan

[73] Assignee: Minolta Co., Ltd., Osaka, Japan

[21] Appl. No.: 323,435

[22] Filed: Oct. 14, 1994

[30] Foreign Application Priority Data

Oct. 15, 1989 [JP] Japan ............................. 5-281689

[51] Int. Cl.$^6$ ................................................ H04N 1/387
[52] U.S. Cl. .......................... 358/450; 358/451; 358/452; 382/284
[58] Field of Search ................................. 358/450, 452, 358/451, 453, 443; 382/284

[56] References Cited

U.S. PATENT DOCUMENTS

| | | | |
|---|---|---|---|
| 4,538,183 | 8/1985 | Kanno et al. | 358/452 |
| 5,029,224 | 7/1991 | Fujisawa | 382/22 |
| 5,051,843 | 9/1991 | Hayashi | 358/450 |
| 5,113,267 | 5/1992 | Lee | 358/450 |
| 5,140,647 | 8/1992 | Ise et al. | 382/284 |
| 5,191,440 | 3/1993 | Levine | 358/452 |
| 5,357,348 | 10/1994 | Moro | 358/450 |
| 5,452,105 | 9/1995 | Tamagaki et al. | 358/452 |
| 5,461,459 | 10/1995 | Muramatsu et al. | 358/452 |
| 5,465,163 | 11/1995 | Yoshihara et al. | 358/450 |
| 5,481,375 | 1/1996 | Eto et al. | 358/450 |
| 5,488,674 | 1/1996 | Burt et al. | 382/284 |
| 5,517,319 | 5/1996 | Arai | 358/450 |
| 5,581,377 | 12/1996 | Shimizu et al. | 382/284 |
| 5,625,720 | 4/1997 | Miyaza et al. | 382/284 |
| 5,644,411 | 7/1997 | Tamagaki et al. | 358/453 |

FOREIGN PATENT DOCUMENTS 3-93355    4/1991  Japan .
3-93355(A) 4/1991  Japan .

OTHER PUBLICATIONS

Handbook of Image Analysis, pp. 463–466, Jan. 1991.

*Primary Examiner*—Peter S. Wong
*Assistant Examiner*—Derek J. Jardieu
*Attorney, Agent, or Firm*—Sidley & Austin

[57] ABSTRACT

In reading out an original image divided into a plurality of regions, a scanner reads out image data having each divided region partially repeated for each adjacent divided region. The read out image data of each divided region is stored in a memory in correspondence with the original image and stored in a memory. A controller identifies an overlapping region of the stored image data, and joins each image data according to the identified result to generate an image data corresponding to the original image.

5 Claims, 15 Drawing Sheets

PANEL UNIT

FIG. 9

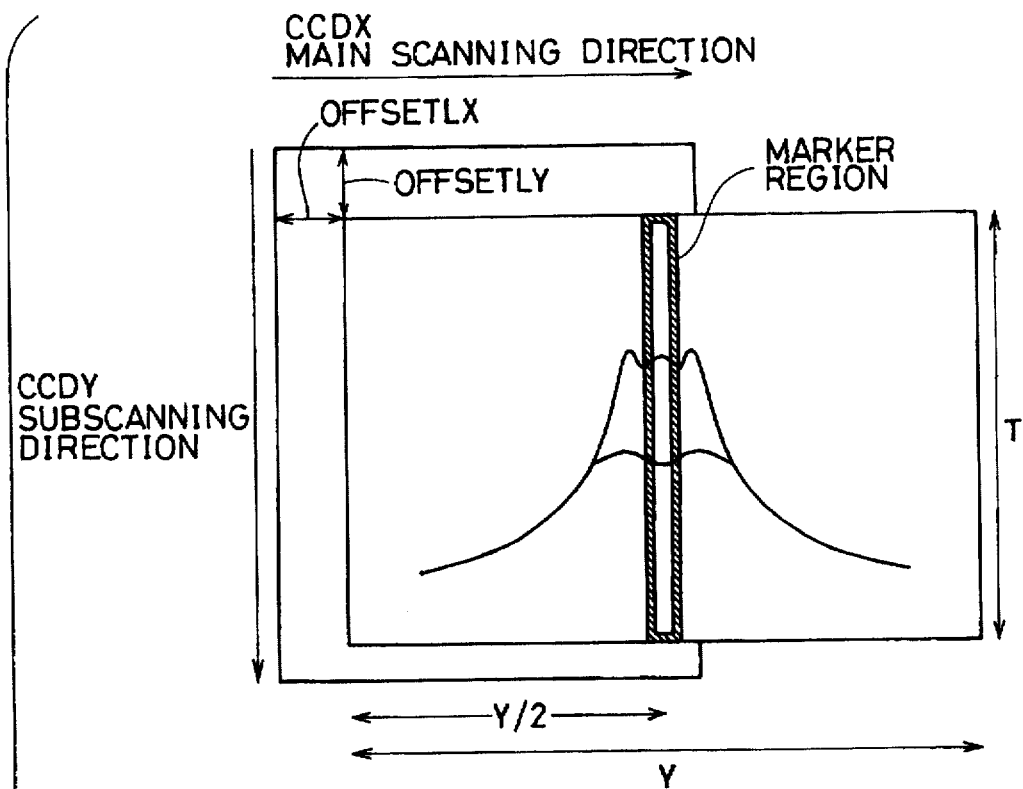
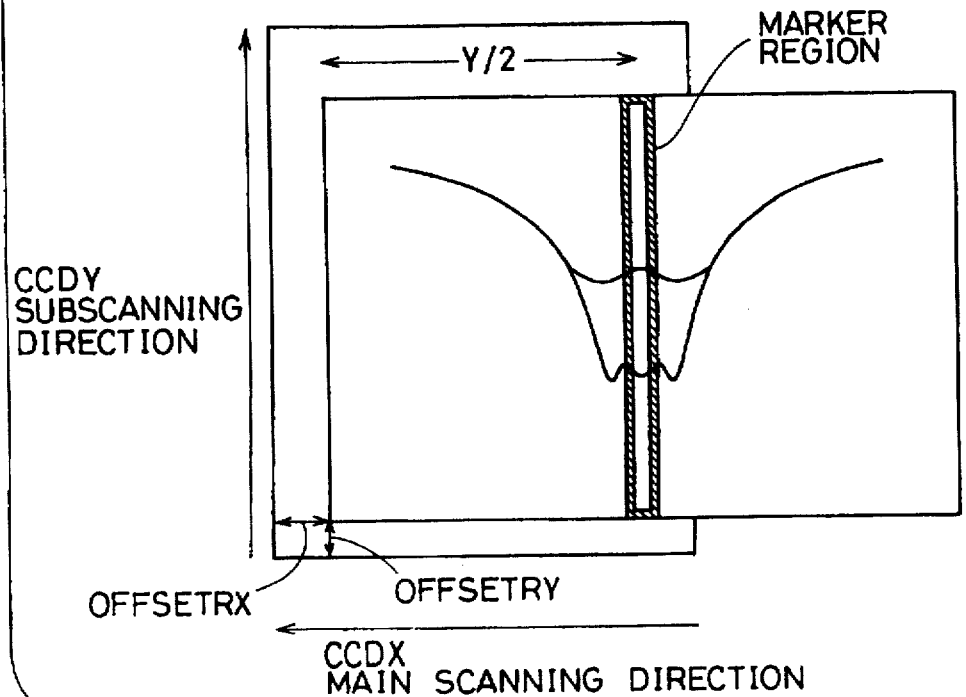
FIG.15

IMAGE READING APPARATUS IMPROVING THE JOINING STATE OF A PLURALITY OF IMAGE DATA OBTAINED BY DIVIDING AND READING OUT AN ORIGINAL IMAGE

BACKGROUND OF THE INVENTION

1. Field of the Invention

The present invention relates to image reading apparatuses, and more particularly to an image reading apparatus that includes the function to divide an oversize original (an original of a size exceeding the size that can be read out by the present apparatus) into a plurality of small regions for reading out the same sequentially, and joining image data of each obtained small region.

2. Description of the Related Art

A diazo type copy machine is used as an apparatus for copying a large original having a size such as A0 to A2. However, this system had the disadvantages that it is difficult to add description on the copy, and that the quality of the image is significantly deteriorated over time. There was also a problem that the odour of ammonia is not desirable from the standpoint of environment. Therefore, a copy obtained according to electrophotography is desired. However this yields the problem that the apparatus thereof is greatly increased. From the foregoing, it is desired to divide a large sized original into a plurality of small regions to sequentially read out the same, and then join the image data of each obtained small region at the boundary to reproduce the original image.

A system is disclosed in page 465 of *Image Analysis Handbook* (published by Tokyo University) to obtain a joining point for joining two consecutive images by searching for the minimum point of density difference in an overlapping region in the proximity of the boundary region of both images.

In pp. 463–465 of the same handbook, a method of correcting density and tone between images is disclosed utilizing an overlapping region in the proximity of the boundary of two images in joining two consecutive images (histogram matching method, linear density conversion method, and average density difference correction method).

Japanese Patent Laying-Open No. 3-93355 discloses a system of detecting a character image region at high accuracy from an image where a character image region and a picture image region are mixed. U.S. Pat. No. 5,029,224 discloses an apparatus that can reliably detect a region that is marked out by a marker pen or the like on an original regardless of the shape thereof.

SUMMARY OF THE INVENTION

An object of the present invention is to prevent image deficiency at a boundary in an image reading apparatus that joins image data, obtained by reading out an original divided into a plurality of divisional regions, at the boundary for reproducing the original image.

Another object of the present invention is to allow appropriate joining, with respect to an original that has small difference in density, in an image reading apparatus that joins image data, obtained by reading out an original divided into a plurality of divisional regions, at the boundary for reproducing the original image.

A further object of the present invention is to carry out correction on the basis of a feature of an image at the boundary and joining each divisional region in an image reading apparatus that joins image data obtained by reading out an original divided into a plurality of divisional regions, at the boundary for reproducing an original image.

Still another object of the present invention is to allow joining at a specified region in an image reading apparatus that joins image data, obtained by reading out an original divided into a plurality of divisional regions, at the boundary for reproducing the original image.

According to an aspect of the present invention for achieving the above objects, an image reading apparatus that reads out image data for each of a plurality of divisional regions of an original image in reading out an original image of a size greater than the image readable size, comprises: a scanner for reading out image data having each divisional region partially repeated with respect to each adjacent divisional region; a memory for storing each image data of each divisional region read out by the scanner in correspondence with the original image; and a controller for identifying an overlapping region where each divisional region overlaps and joining each divisional region according to the identified result to generate a composite image.

According to the image reading apparatus of the above-described structure, an overlapping region is identified, and joining of each divisional region is carried out on the basis of the result thereof. Therefore, image deficiency at the boundary is reliably prevented.

In order to achieve the above objects, an image reading apparatus according to another aspect of the present invention that reads out image data of each of a plurality of divisional regions of an original image in reading out an original image of a size greater than the image readable size, comprises: a scanner for reading out image data having each divisional region specified by an operator partially repeated with respect to each adjacent divisional region; a memory for storing each image data for each divisional region read out by the scanner in correspondence with the original image; and a controller for obtaining a joining point where each divisional region is to be joined in a area specified by the operator, and joining each divisional region at the joining point for generating a composite image.

According to the image reading apparatus of the above-described structure, a joining point is obtained in a specified area, so that appropriate joining is possible for an image that has small difference in density.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 shows an overlap correction data table referred to by the overlap correction circuit of FIG. 7.

FIG. 15 is a diagram for describing an original position and a marker region of the apparatus of FIG. 14.

DESCRIPTION OF THE PREFERRED EMBODIMENTS

(1) First Embodiment

A first embodiment of the present invention will be described hereinafter with reference to FIGS. 1–3.

Figure 1:
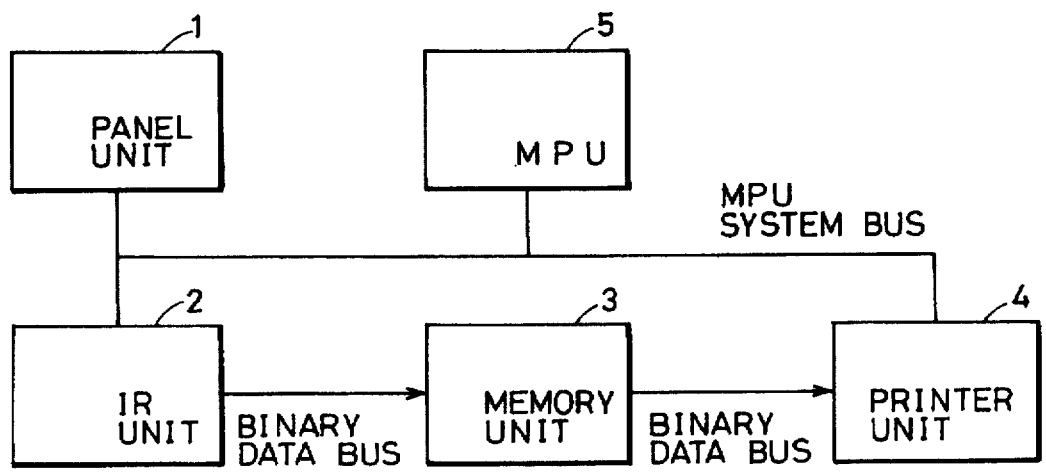
FIG. 1 is a block diagram showing a structure of an apparatus according to a first embodiment of the present invention.

FIG. 1 is block diagram showing a structure of an apparatus of the first embodiment; FIG. 2 shows a panel unit of the present apparatus, and FIG. 3 shows the reading procedure of an oversize original according to the present apparatus.

Referring to FIG. 1, according to an instruction from a panel unit 1, the present apparatus reads the original image by an IR unit 2 to generate image data. This image data is processed at a memory unit 3 to be joined, and then sent to a printer unit 4. Printer unit 4 prints out an image reproduced on the basis of the provided image data. A MPU 5 carries out a process for executing these procedures.

Figure 2:
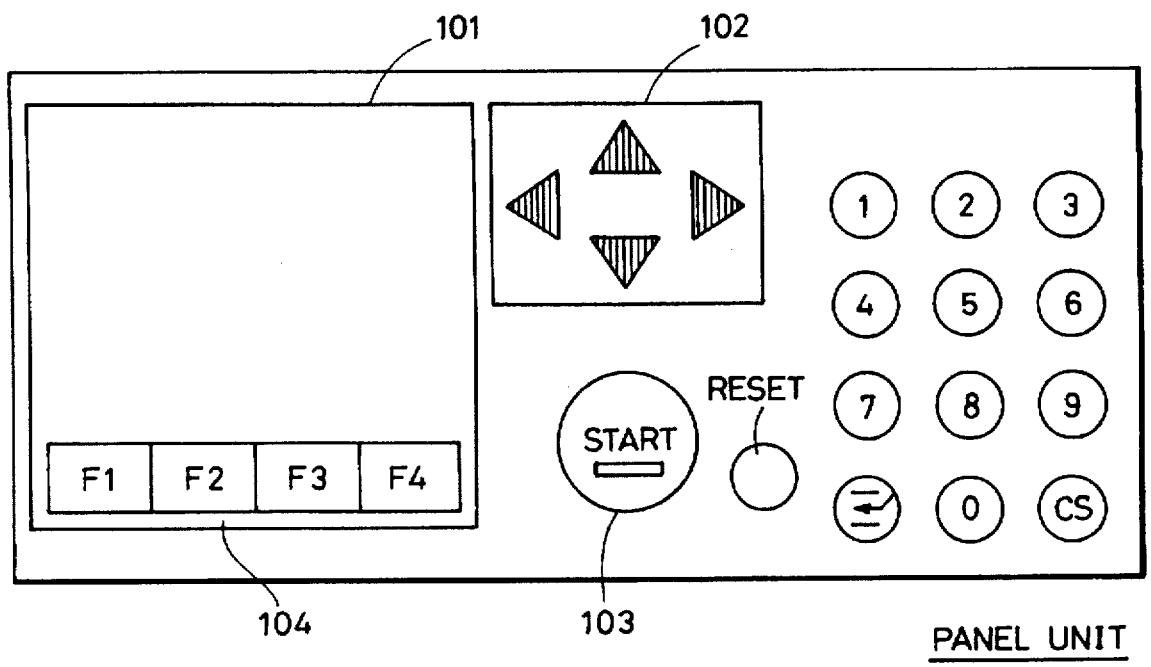
FIG. 2 shows a panel unit of the apparatus of FIG. 1 according to the present invention.

Referring to FIG. 2, panel unit 1 includes a display 101 in which modes or the like to be specified are displayed, position adjustment keys (an X axis transfer key and a Y axis transfer key) 102 for adjusting the X and/or Y coordinates in joining image data at the boundary of consecutive originals, and a start key (print key) 103 for instructing the start of a reading operation or the like. Display 101 includes mode specification keys 104 including keys F1–F4 for setting a displayed mode. Also, panel unit 1 includes ten numerical keys, a reset key for mode reset, an interruption key, and a clear-stop key.

Figure 3:
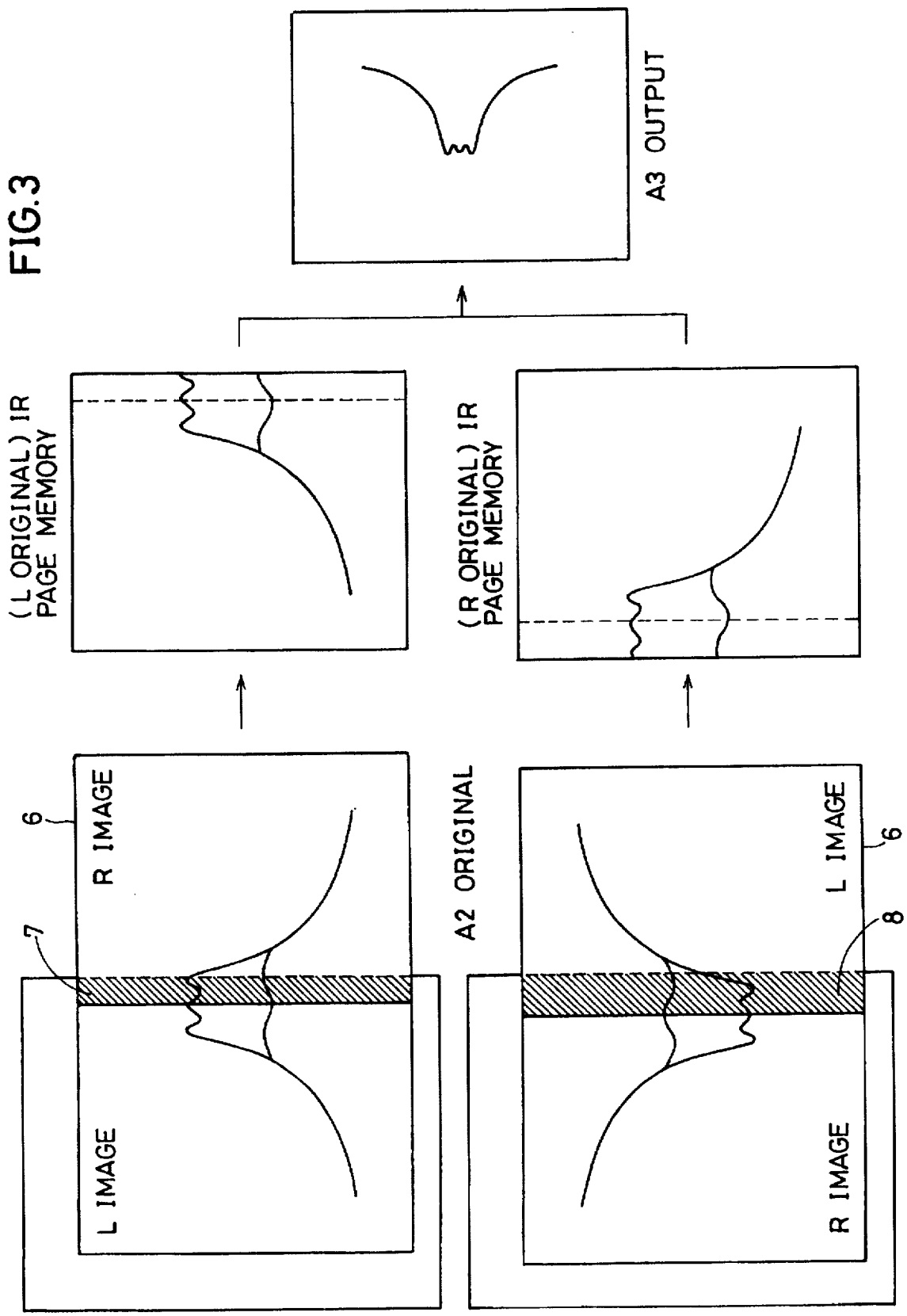
FIG. 3 is a diagram showing the reading and joining procedure of an oversize original according to the apparatus of FIG. 1.

Referring to FIG. 3, the present apparatus reads out the left half (L image) of an oversize original 6 which is A2 in size, and then reads out the right half (R image). In this read out, the overlapping regions 7 and 8 indicated by the hatched lines in the drawing are respectively read out. Image L and image R are joined according to the image of the overlapping regions, and outputted in A3 size.

Figure 10:
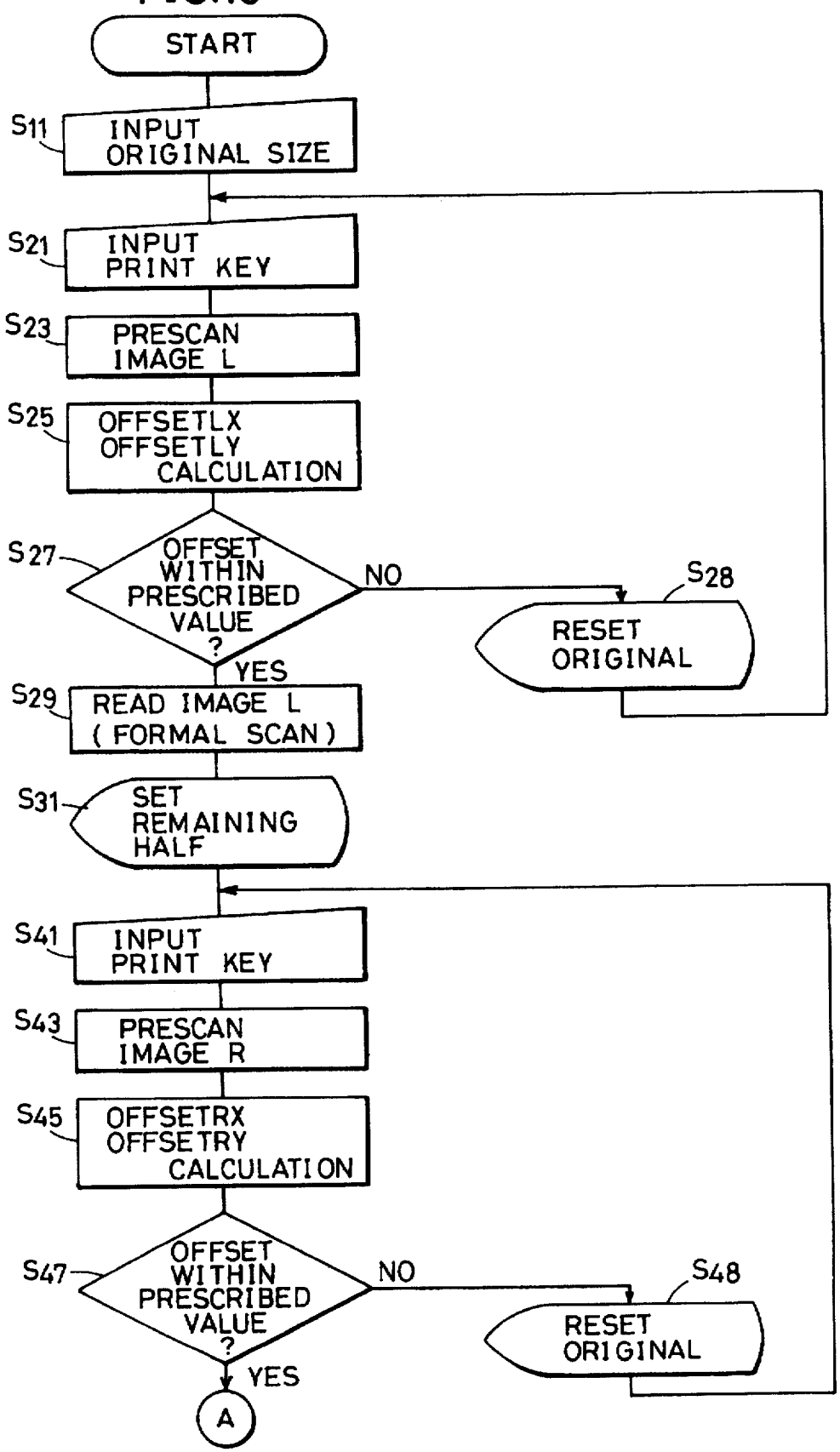
FIG. 10 is a flow chart showing a portion of the reading and joining procedure of an oversize original according to the apparatus of FIG. 1.

The reading and joining procedure of an oversize original image using the apparatus of first embodiment will be described hereinafter according to FIGS. 10 and 11, and with reference to FIGS. 4, 6, 12 and 13.

When an original readable state is entered, a display that prompts selection of the original size (and the output sheet size) appears on panel unit 1 as shown in FIG. 12(a). In response, the original size is entered (S11). If the entered size exceeds size A3 which is the readable original size of the present apparatus, a display prompting a particular setting of the original appears as shown in FIG. 12(b). Here, an original of size A2 which is two times the size of A3 is selected. Therefore, a display indicating the setting of a half (the left (L) half) of the original is shown. Then, the apparatus stands by for the entry of a print key (start key) to instruct reading and printing out of the original image.

When the print key is pressed to provide an input (S21), a prescan operation in the positive direction (here, a prescan of image L) is carried out for detecting the position of the original (S23). The offset of the original with respect to the readout coordinates (OFFSETLX, OFFSETLY) is detected (S25).

Figure 4:
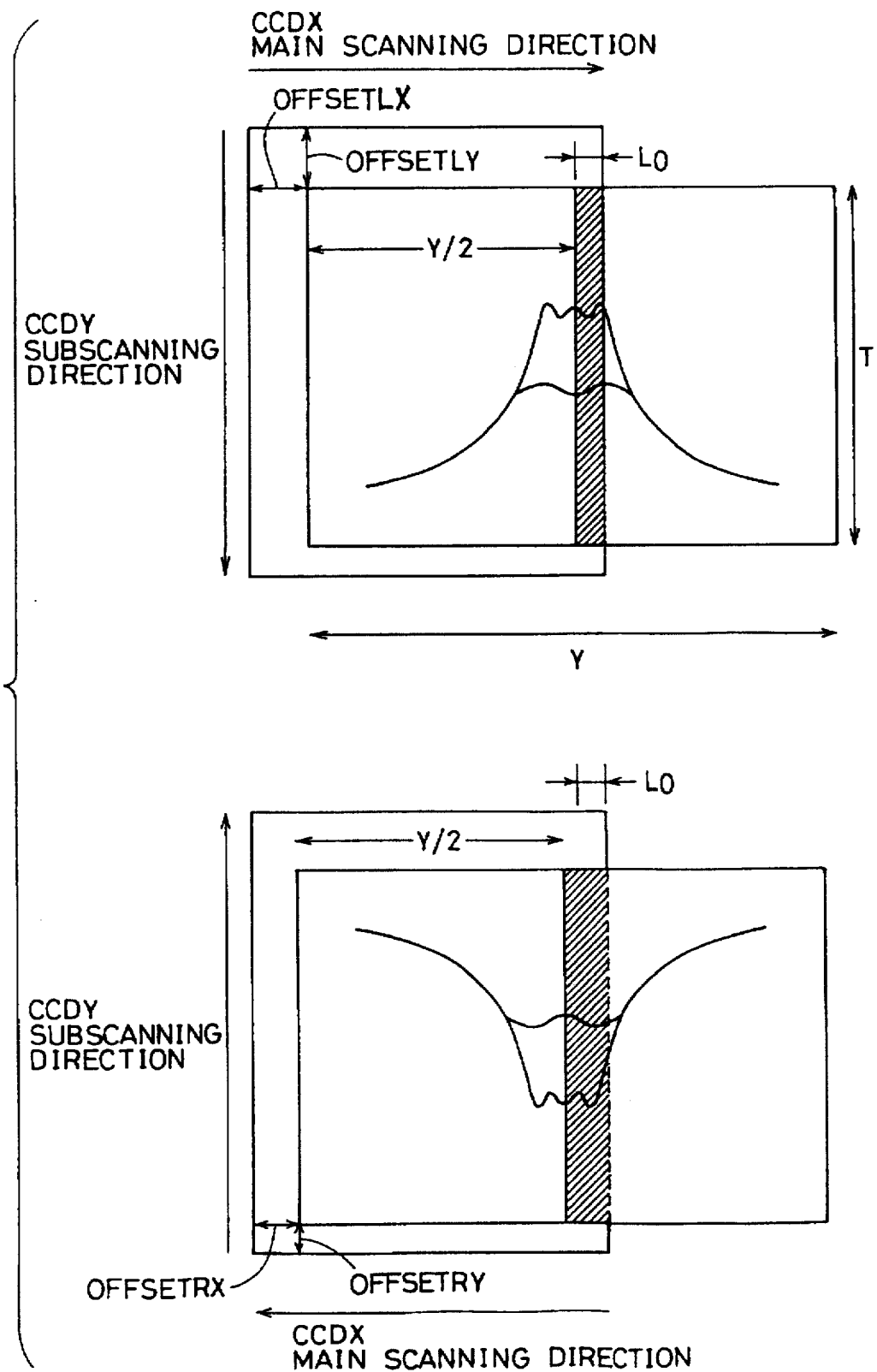
FIG. 4 is a diagram for describing an original position of the apparatus of FIG. 1.

OFFSETLX is the amount (for example, the number of pixels) representing the degree of offset of the left edge of original L with respect to the starting position of the main scan, and OFFSETLY is the amount (for example, the number of pixels) representing the degree of offset of the top edge of original L from the starting position of the subscan, as shown in FIG. 4.

Detection of the original position may be carried out, not by a prescan, but by means of a photosensor arranged in an array, for example.

When OFFSETLX is calculated, determination is made whether that value is within a prescribed value (S27). More specifically, a determination is made as to whether or not the width of the region (overlapping region), on which the image of the remaining half (the right (R) half) of the original is to be overlaid, is sufficient (S27). If the equation of:

$$CCDX-(OFFSETLX+Y/2) \geq L0$$

is satisfied, determination is made that the value is within the prescribed value, i.e. the width of the overlapping region is sufficient. Here, CCDX is the length of the region that can be scanned by the main scanning operation (for example, the number of pixels), and Y/2 is half the length of the lateral width Y of the original (which is the lateral width of each of images L and R; more strictly, the value of the lateral width converted into the number of pixels). L0 is approximately 32 dots in the case of 400 dpi resolution.

When determination is made at step S27 that the value is not within the above-described prescribed value (NO in S27), a warning message is displayed as shown in FIG. 12(c) to promote proper resetting of the original (S28). If the width of the overlapping region is not sufficient, there is a possibility of information being missing at the middle of the composite copy, or resulting in a composite copy that is joined unnaturally due to insufficient correction of the joined region. This warning is not restricted to a display message, and may be carried out by a buzzer or blinking of a lamp.

Figure 6:
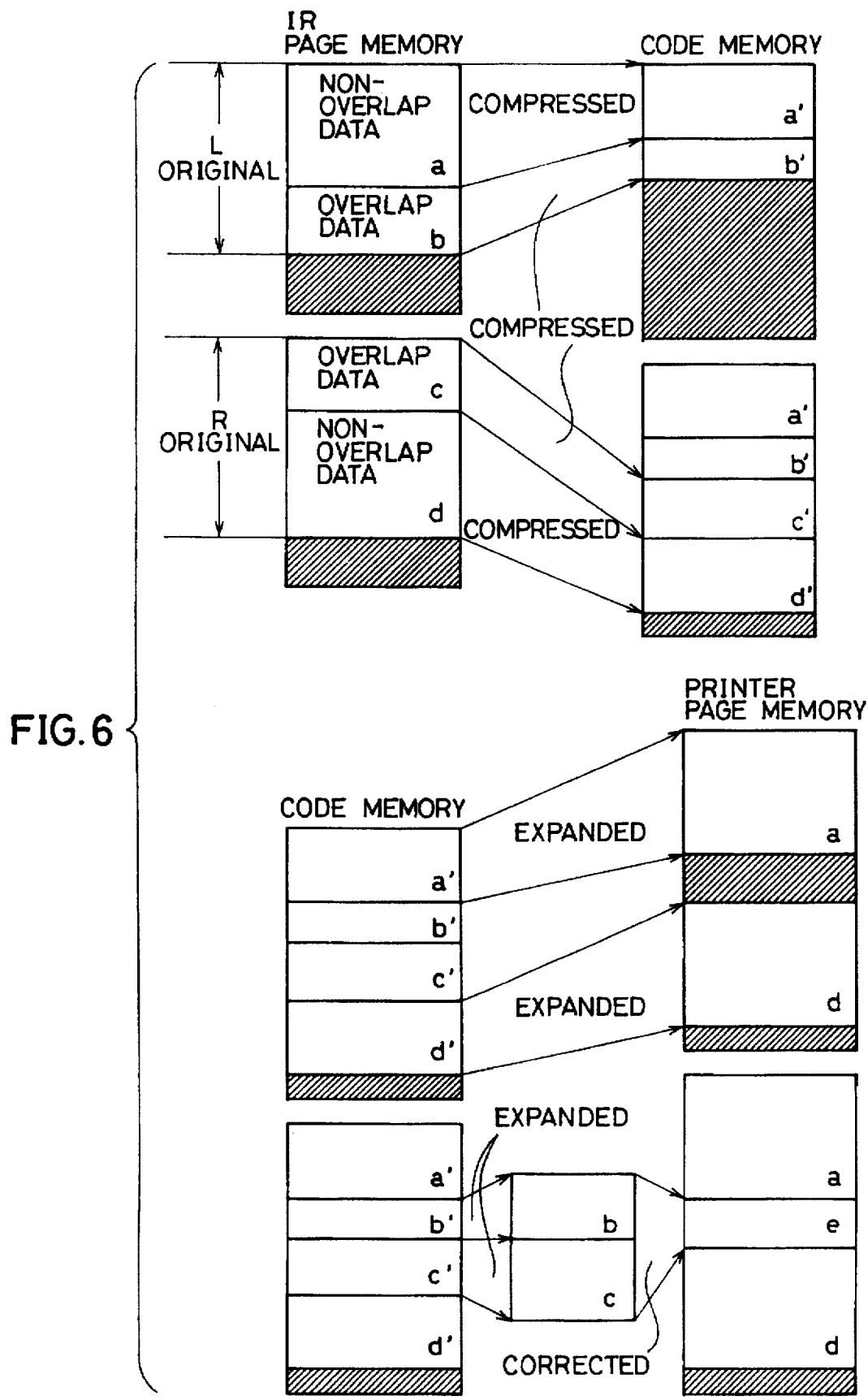
FIG. 6 is a diagram showing the stored state of each memory of the memory unit of FIG. 5.

When determination is made in step S27 that the value is within the prescribed value, i.e. when the width of the overlapping region is sufficient (YES in S27), image L (more precisely, image L and the image of the overlapping region) is read out by the formal scanning operation, whereby image data is generated (S29). This image data is divisional into image data a of the non-overlapping region and image data b of the overlapping region to be stored in the L original region of an IR page memory, as shown in FIG. 6. The process of the image data stored in the IR page memory will be described afterwards.

Then, a message indicating the setting of the remaining half (the right (R) original) in the opposite direction is displayed (S31) as shown in FIG. 12(d).

Processes similar to those of the above-described original L is carried out for the original R set in the opposite direction (S41–S49). The generated image data is divisional into image data c of the overlapping region and image data d of the non-overlapping region, as shown in FIG. 6, and stored into the R original region of the IR page memory. The scanning operation of original R is carried out in the opposite direction. The process of the image data stored in the IR page memory will be described afterwards.

The output coordinates of images L and R are calculated (S61) according to the size of the original, OFFSETLX and OFFSETLY of image L, and OFFSETRX and OFFSETRY of image R (refer to FIG. 4) calculated in a similar manner.

Image data are developed in the printer page memory according to the calculated output coordinates. For image data b and c of the overlapping regions, the joined and corrected image data e shown in FIG. 6 are developed according to the joining region correction unit shown in FIGS. 5 and 7. The function of the joining region correction unit will be described afterwards.

According to the developed image data, a joined image is displayed (S65), as shown in FIG. 13(e). Since offset is generated in the joined region as shown in FIG. 13(e), a message is displayed indicating that the offset is to be adjusted using the X axis transfer key and/or the Y axis transfer key. This adjustment may be carried out using the keys F1–F4 as shown in FIG. 13(g).

At step S67, waiting is conducted for the input of a key.

In the case where offset adjustment is prompted as in FIG. 13(e), input is carried out by the X axis transfer key (or Y axis transfer key) (YES at S81, or YES at S85). In response to an input key, the X axis coordinates of image R (or Y axis coordinates of image R) is corrected (S83 or S87), and the control returns to step S63. As a result, image data are developed in the printer page memory according to the corrected output coordinates (S63). An image joined according to this image data is displayed (S65) as shown in FIG. 13(f).

When there is no offset between images L and R displayed at step S65 (including the case where offset is eliminated according to the above-described adjustment), an input is carried out by the print key (YES at S71). In response, the image data in the printer page memory is transferred to the printer unit (S73). As a result, print out is carried out by the printer unit.

Figure 5:
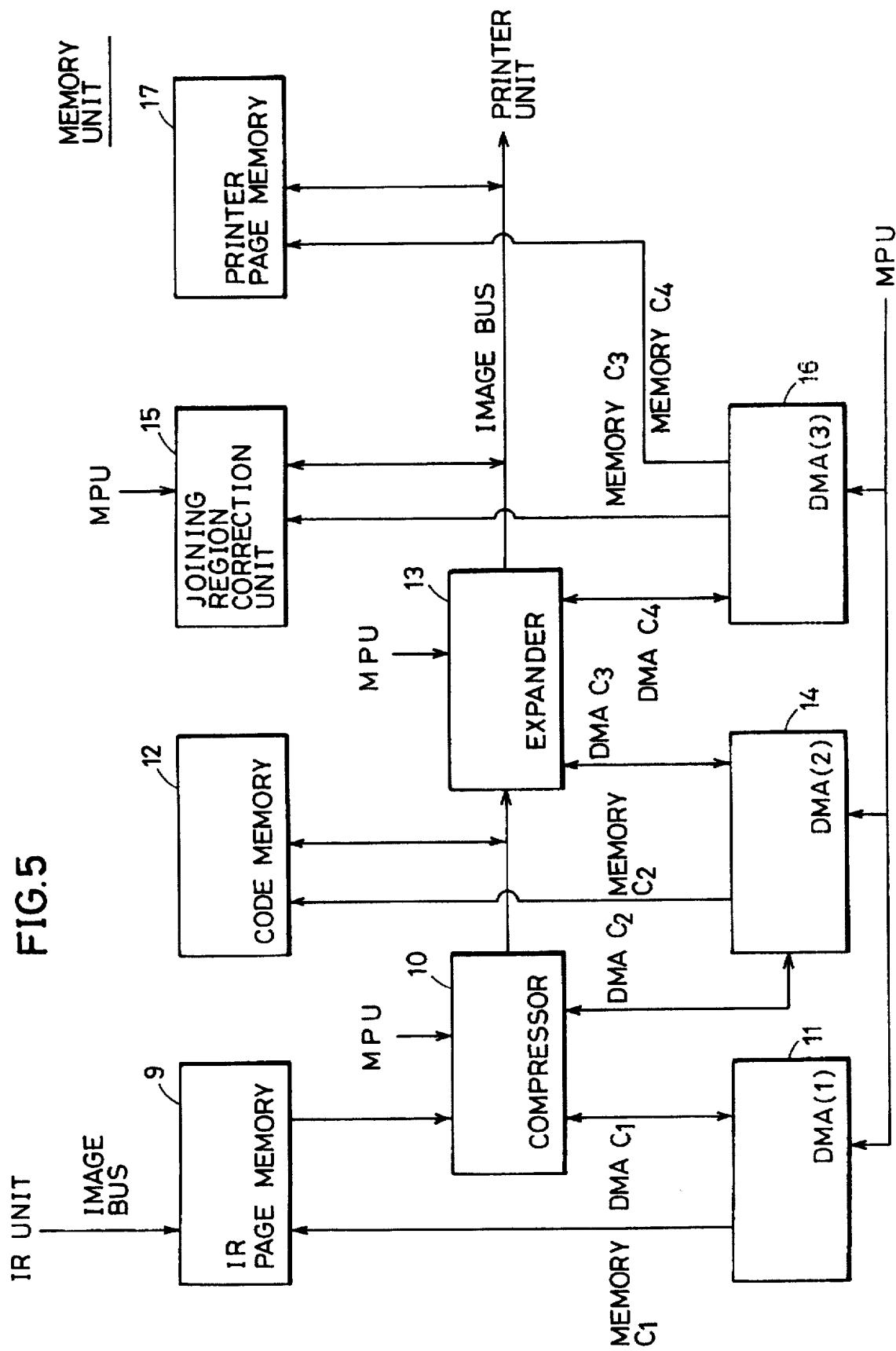
FIG. 5 is a block diagram showing a memory unit of the apparatus of FIG. 1.
Figure 7:
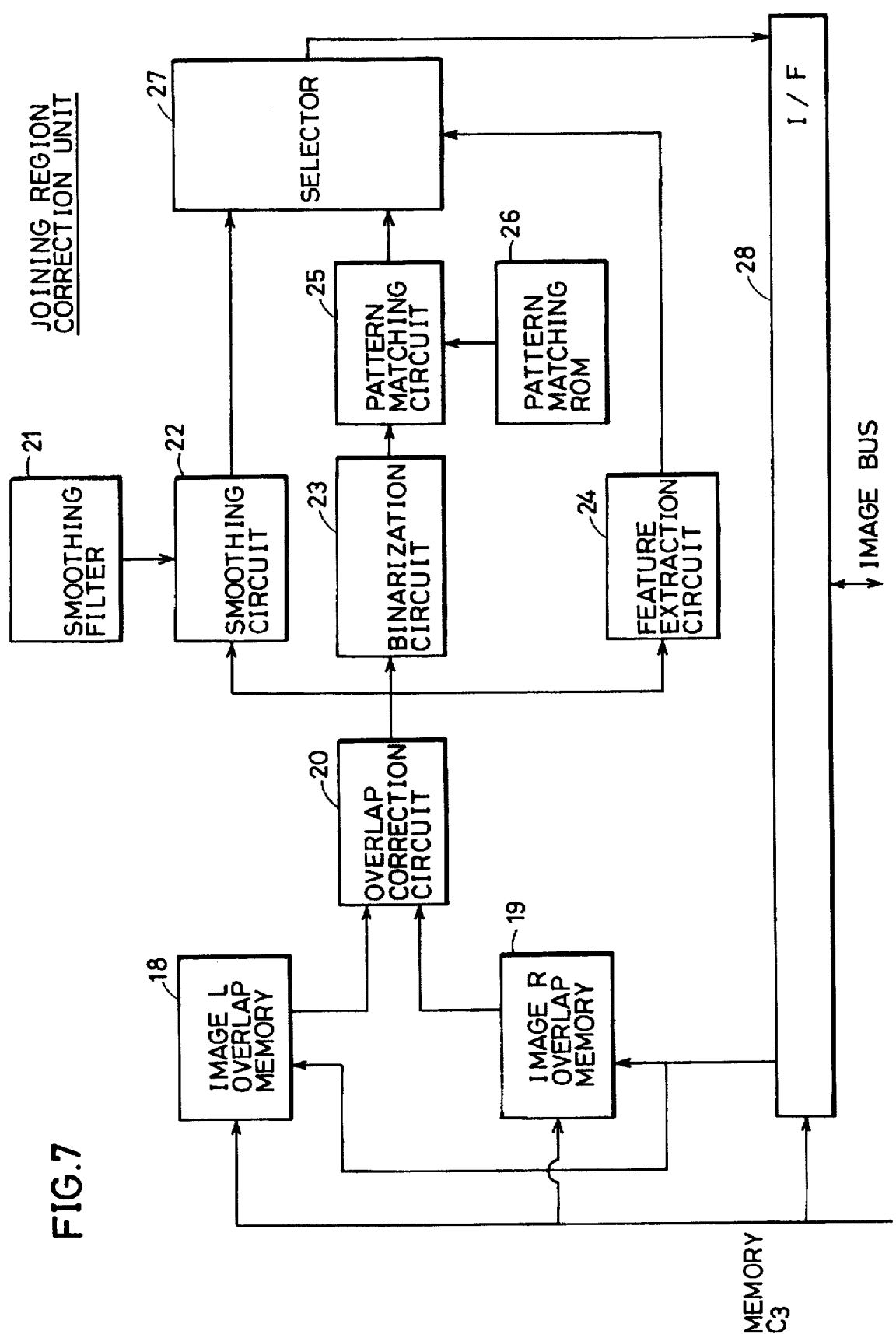
FIG. 7 is a block diagram showing the joining region correction unit of FIG. 5.

Image data processing in memory unit 3 of FIG. 1 (including the process carried out by the joining region correction unit) will be described hereinafter with reference to FIGS. 5–7.

The image data generated according to the read out by the IR unit is passed through an image bus and developed in an IR page memory 9. Then, it is coded by a compressor 10. For example, image data a of the non-overlapping region of original L is coded as code data a', and image data b of the overlapping region is coded as code data b'. Also, image data c of the overlapping region and image data d of the non-overlapping region of original R are coded as code data c' and code data d', respectively. These processes are controlled by a first memory control signal (memory C1) and a first DMA control signal (DMA C1) from a DMA (1) (Direct Memory Access Controller) 11.

Code data a', b', c', and d' coded by compressor 10 are stored into a code memory 12 via a code data bus, as shown in FIG. 6. These processes are controlled by a second DMA control signal (DMA C2) from a DMA (2), and a memory control signal 2 (memory C2).

Code data a', b', c' and d' stored in code memory 12 are controlled by second memory control signal (memory C2) from DMA (2) 14 and read out if necessary. The read out data is controlled by a third DMA control signal 3 (DMA C3) and transferred to an expander 13 via the code data bus. Thus, transmission and reception of data between the compressor-code memory-expander is carried out via the code data bus.

Each of code data a', b', c' and d' provided to expander 13 is controlled by a DMA control signal (DMA C4) from DMA (3) 16 to be expanded, resulting in image data a, b, c and d.

The expanded image data a and image data d of the non-overlapping regions are controlled by a fourth memory control signal (memory C4) from DMA (3) to be developed as shown in FIG. 6 in printer page memory 17 via the image bus.

The expanded image data b and image data c of the overlapping regions are controlled by third memory control signal (memory C3) from DMA (3) to be developed in joining region correction unit 15 via the image bus. They have the joining region corrected to result in image data e. Image data e is controlled by third memory control signal (memory C3) to be read out. The read out data are controlled by fourth memory control signal (memory C4) from DMA (3) 16 to be developed as shown in FIG. 6 in printer page memory 17 via the image bus.

Figure 11:
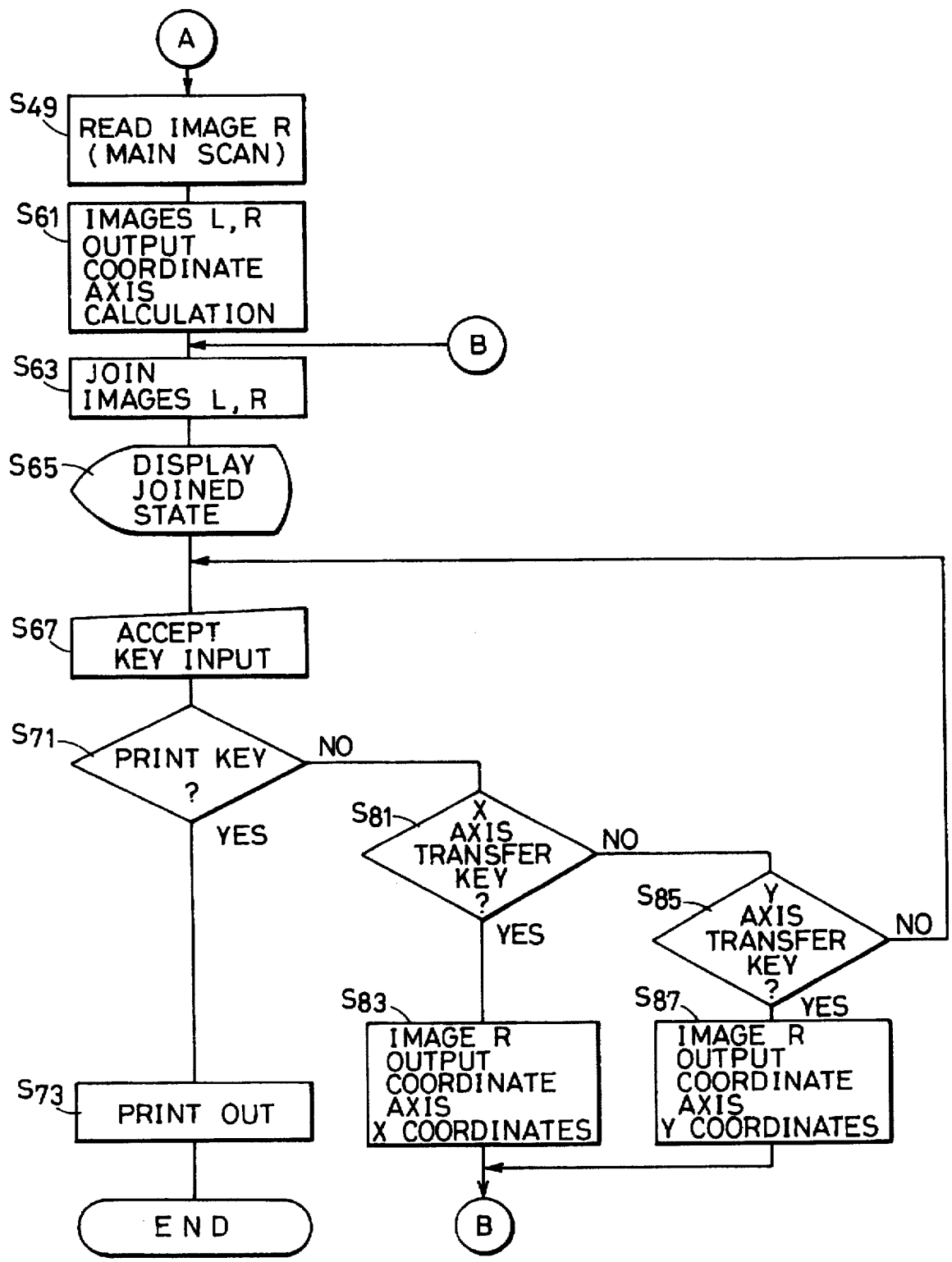
FIG. 11 is a flow chart showing the remaining portion of the reading and joining procedure of the oversize original according to the apparatus of FIG. 1.
Figure 12:
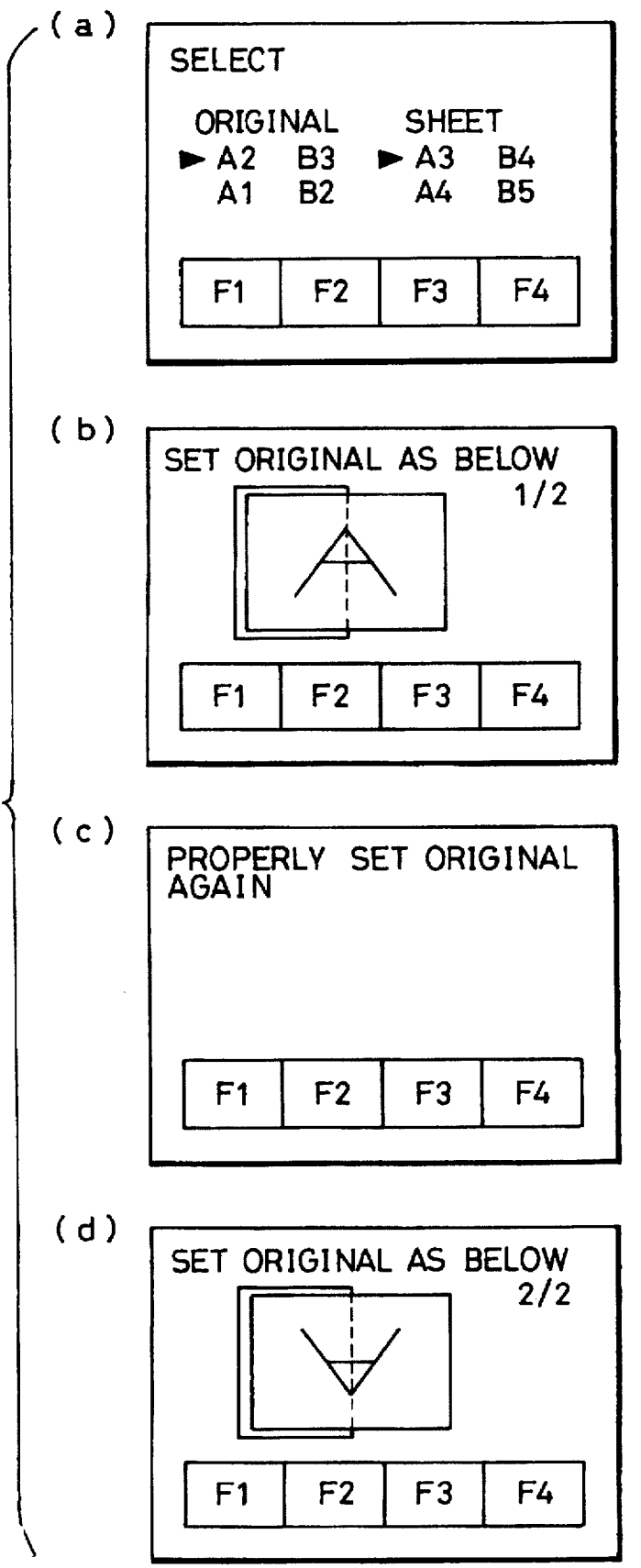
FIG. 12 is a diagram for describing a display of a panel unit of the apparatus of FIG. 1.
Figure 13:
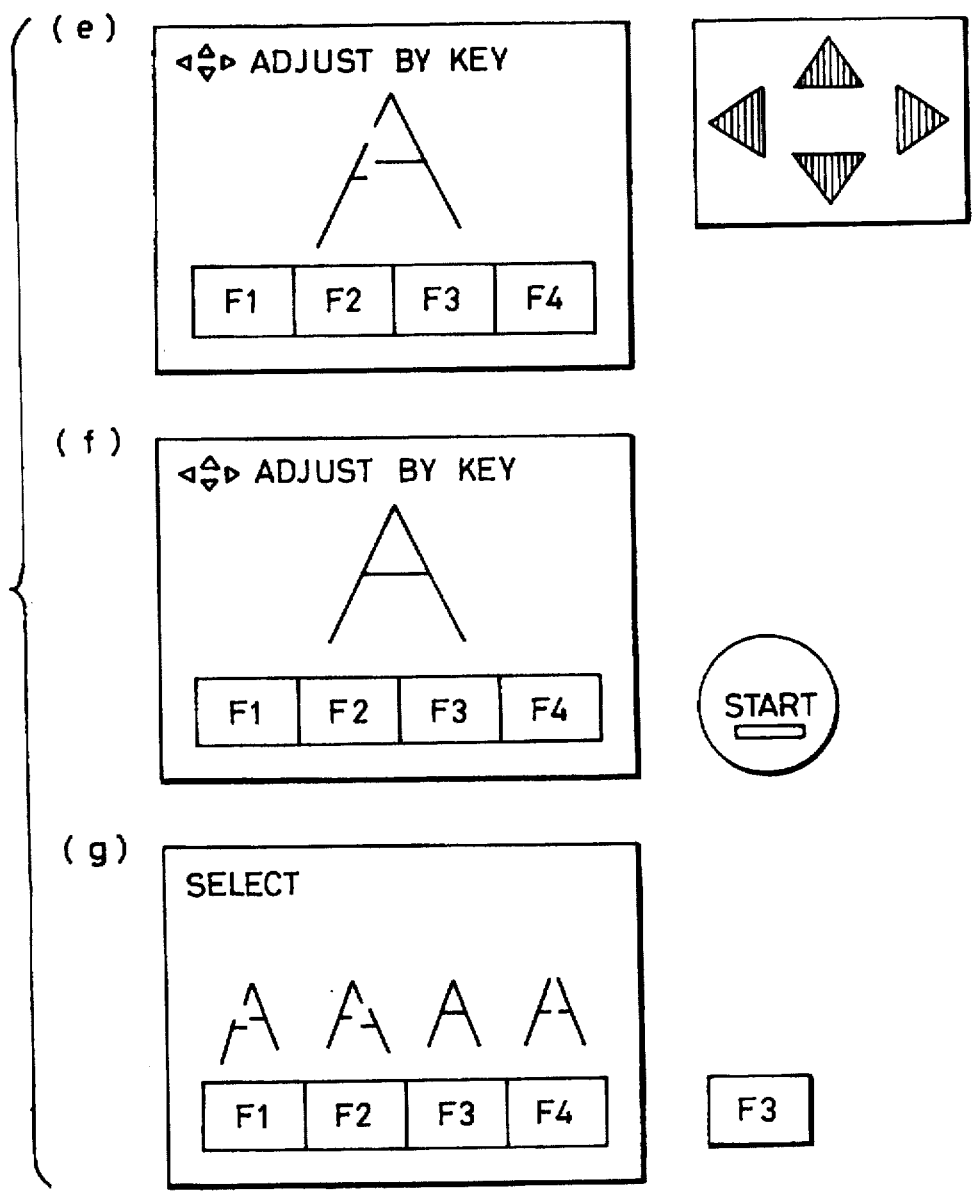
FIG. 13 is a diagram for describing a display of the panel portion of the apparatus of FIG. 1.

The image data a, e, and d developed in printer page memory 17 are provided to the printer unit via the image data bus in response to an input of a print key (refer to step S71 in FIG. 11).

Correction carried out by the joining region correction unit will be described hereinafter with reference to FIG. 7.

Image data b of the overlapping region of image L and image data c of the overlapping region of image R are provided to joining region correction unit 15 from expander 13 via the image bus. In joining region correction unit 15, image data b is stored in L image overlap memory 18, and image data c is stored in a R image overlap memory 19.

Figure 8:
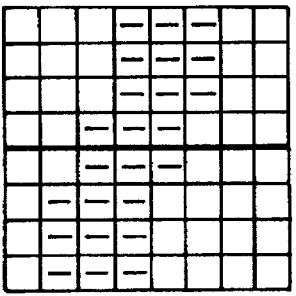
FIG. 8 shows an overlap correction data table referred to by the overlap correction circuit of FIG. 7.
Figure 9:
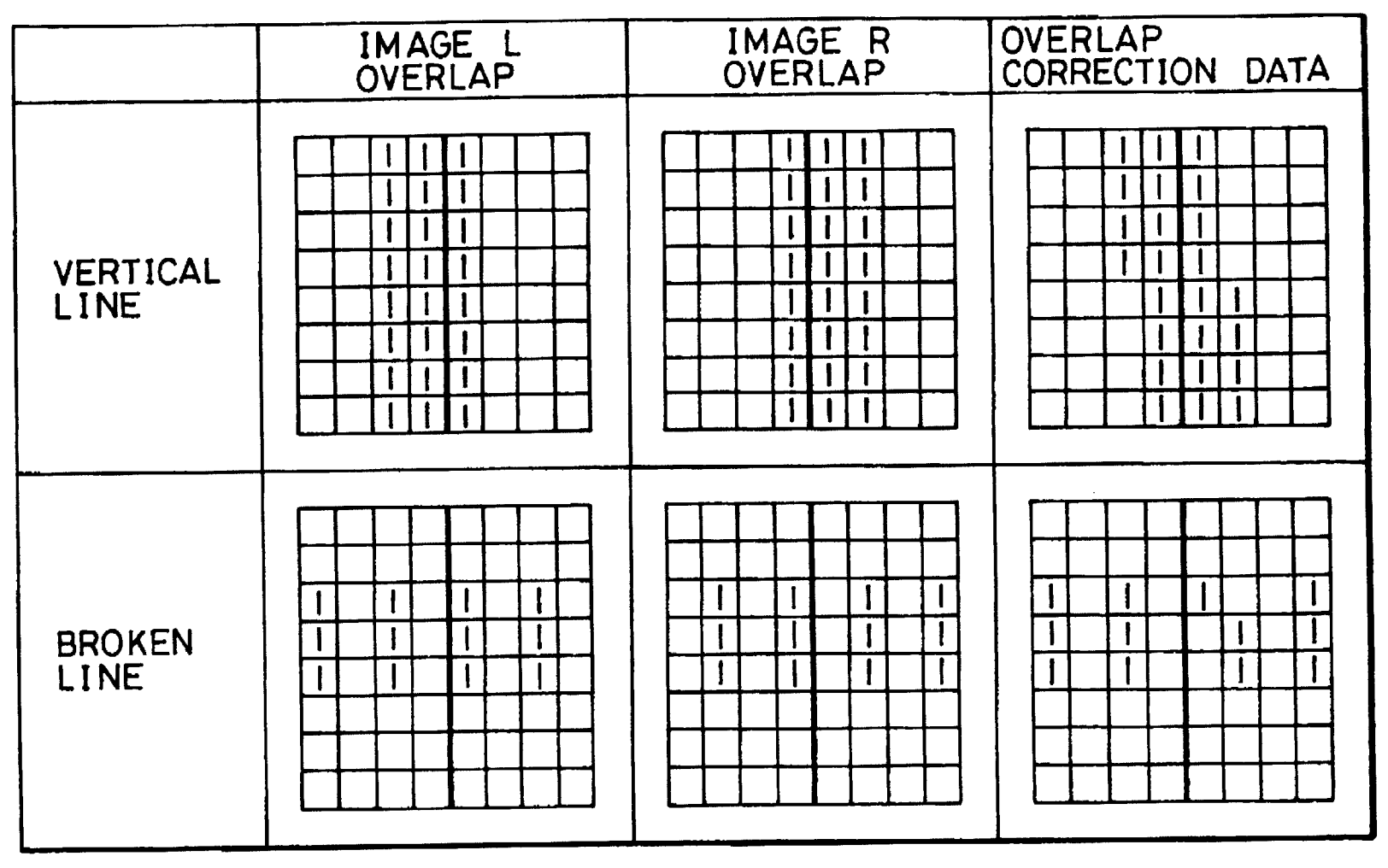

Image data b from L image overlap memory 18 and image data c from R image overlap memory 19 are respectively read out to be provided to an overlap correction circuit 20. Overlap correction circuit 20 carries out data correction of the overlapping region according to the overlap correction data table shown in FIGS. 8 and 9.

The corrected data are provided to a smoothing circuit 22, a binarization circuit 23, and a feature extraction circuit 24. The data provided to smoothing circuit 22 are subjected to a smoothing process according to a specified smoothing filter 21. The data sent to binarization circuit 23 are subjected to binarization and then provided to a pattern matching circuit 25 in which a pattern matching process is carried out based on data of a pattern matching ROM 26. In feature extraction circuit 24, determination is made whether the data therein is character data or picture data according to a well known method. The attribute information thereof is provided to a selector 27.

Selector 27 provides an output of smoothing circuit 22 or pattern matching circuit 25 to an interface 28 according to the attribute information from feature extraction circuit 24. More specifically, when data are picture data, the output of smoothing circuit 22 is provided to interface 28. When the data are character data, the output of pattern matching circuit 25 is provided to interface 28. The data provided to interface 28 are controlled by third memory control signal (memory C3) to be read out as the above-described data e. The read out data are provided to printer page memory 17 via the image bus.

Thus, image data b and image data c of the overlapping regions are corrected, and image data e are generated.

(2) A Second Embodiment

A second embodiment of the present invention will be described hereinafter with reference to FIGS. 14, 15 and 16.

Figure 14:
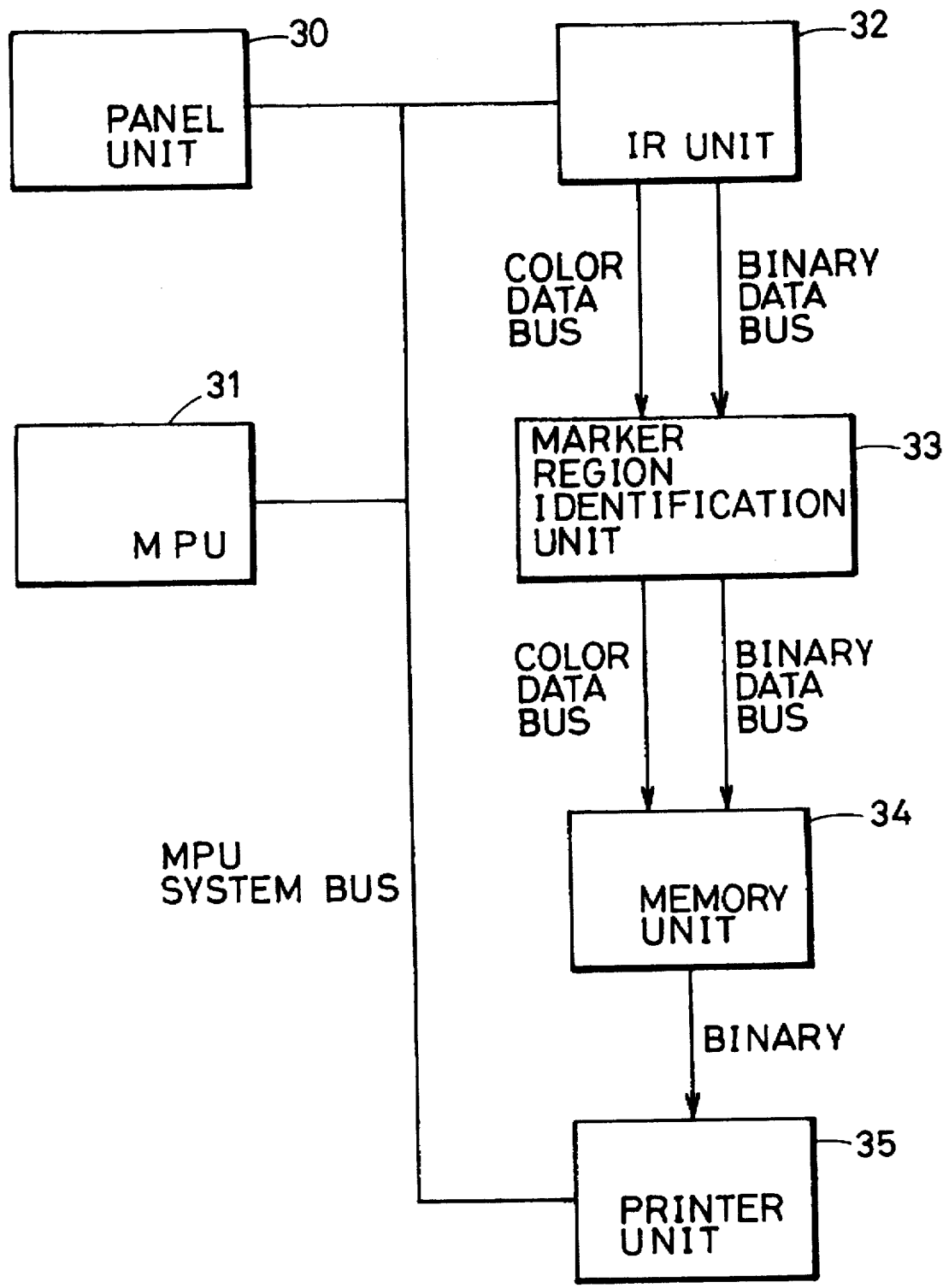
FIG. 14 is a block diagram showing the structure of an apparatus according to a second embodiment of the present invention.

Referring to FIG. 14, in the apparatus of the second embodiment, a region distinguished by a marker pen is identified by a marker region identification unit 33 when image data read by an IR unit 32 in response to instructions from panel unit 30 are stored in a memory unit 34. Also, the image data stored in memory unit 34 are provided to a printer unit 35, whereby print out is carried out.

Figure 16:
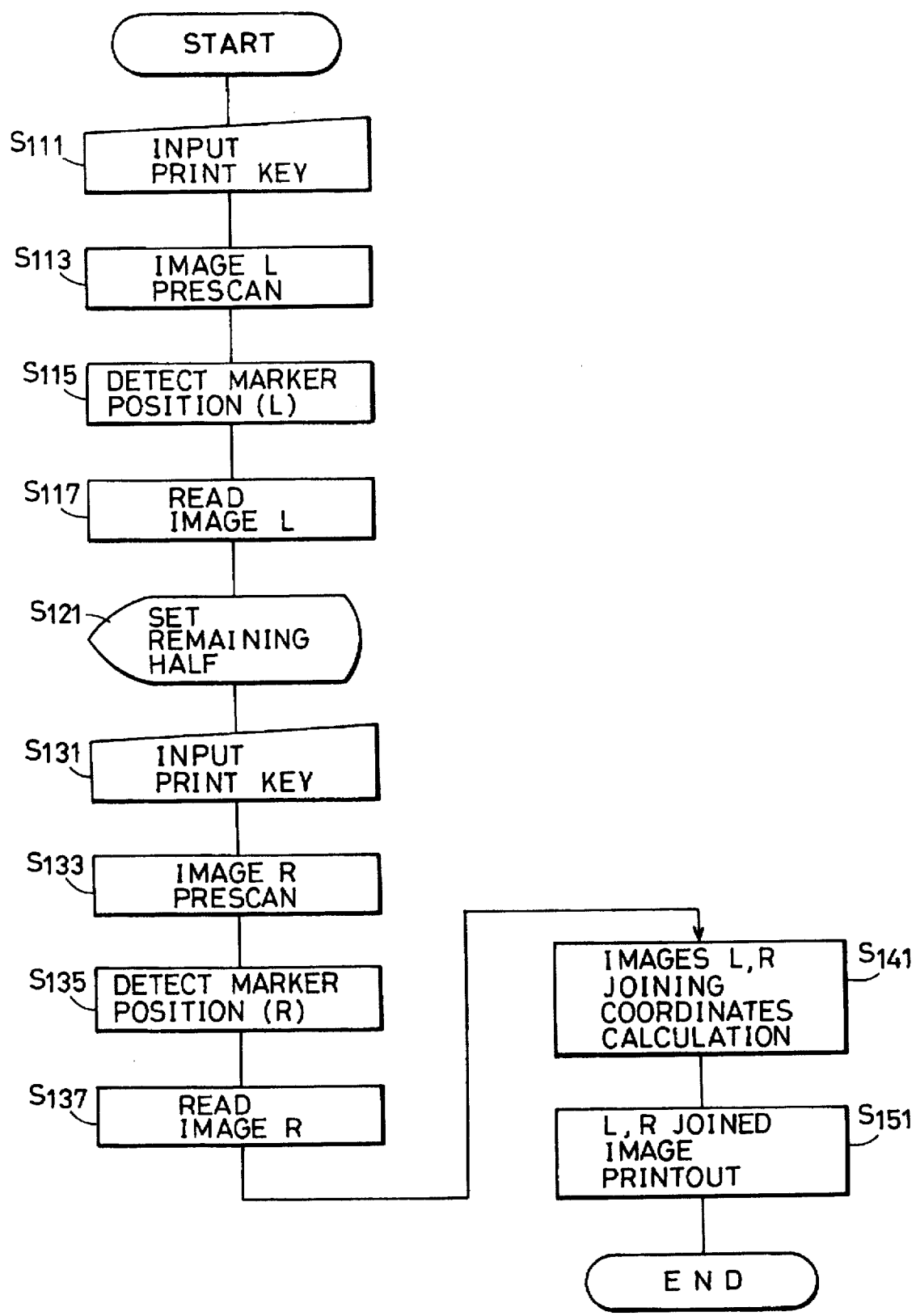
FIG. 16 is a flow chart showing the reading and joining procedure of an oversize original according to the apparatus of FIG. 14.

Reading out an original image is carried out according to the procedure shown in FIG. 16.

Here, a case is described in reading out an A2 size original by a scanner that can read an original of a maximum size of A3. It is presumed that a marker region is designated in advance by a marker pen as shown by the shaded area in FIG. 15.

When the print key is pressed to provide an input (S111) after an original is set, substantially the left half (image L) of an original, set as shown in the upper stage of FIG. 15, is prescanned (S113). The data obtained by this prescanning is processed by marker region identification unit 33, whereby the marker region at the edge of the image L is detected (S115). Marker region identification unit 33 can be formed by well known means. Similar to the first embodiment, the original position of image L is detected according to OFFSETLX and OFFSETLY.

When a marker region is detected, read out of image L are carried out (S117). L image data is generated to be stored in memory unit 34, and the image data of the marker region which are the overlapping region is stored in memory unit 34.

Then, a message instructing the remaining half of the original to be set is displayed (S121).

In response to this display, substantially the right half (image R) of the original is set in an upside down direction as shown in the lower stage of FIG. 15. In response to an input by the print key (S131), prescanning is carried out (S133) similar to that of image L, and a marker region at the edge of image R is detected (S135). Similar to the first embodiment, the original position of image R is detected according to OFFSETRX and OFFSETRY.

When a marker region is detected, image R is read out (S137). As a result, R image data are generated to be stored in memory unit 34. Also, image data of the marker region which is an overlapping region are stored in memory unit 34.

When image data of the L side and the R side, and the two image data of the marker regions are obtained, each joining point is searched for according to the image data of these two marker regions. More specifically, each of the joining timing of images L and R is calculated (S141).

Images L and R are joined at the calculated timing, and print out is carried out (S151).

The present invention is not limited to the above-described two embodiments where an A2 size original is divisional into 2 regions and read out by a scanner of A3 size, and may be applied to the cases of sizes A0 and A1, and also for B type sizes (8-division, 4-division, or the like)

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus that reads out image data of each of a plurality of divisional regions of an original image in reading out an original image of an original document mounted on said apparatus wherein the original document has a size which is greater than an image readable region which is readable by said apparatus, said apparatus comprising:

a scanner which reads out image data sequentially for each of said plurality of divisional regions of said original image so that the thus read image data for a respective divisional region includes the respective divisional region partially overlapped with respect to each divisional region adjacent to said respective divisional region;

a memory which stores said thus read image data for each divisional region in correspondence to a position of the respective divisional region with respect to the original image, and a controller which identifies an overlapping region where a respective divisional region is overlapped with a divisional region adjacent to said respective divisional region, and joins the thus read image data for said divisional regions according to the thus identified overlapping regions in order to generate a composite image of said divisional regions;

wherein said controller identifies an overlapping region by making a determination of the position of each respective divisional region with respect to the original image by detecting an offset amount between a mounted position of said original document on said apparatus and a scan starting position of said scanner when scanning each respective one of the plurality of divisional regions, and comparing the position of each said divisional region and a size of the original document to identify an overlapping region.

2. An image reading apparatus in accordance with claim 1, wherein said controller makes a determination of whether or not a width of a thus identified overlapping region exceeds a predetermined value.

3. An image reading apparatus in accordance with claim 2, further comprising a warning device that generates a warning to an operator when said width of an overlapping region is smaller than said predetermined value.

4. An image reading apparatus in accordance with claim 1, wherein said scanner scans image data of one of said plurality of divisional regions in a first direction, and scans image data of another of said plurality of divisional regions in a second direction which is opposite to the first direction.

5. An image reading apparatus in accordance with claim 1, wherein said plurality of divisional regions is composed of two divisional regions, each of said divisional regions being approximately one half of said original image.

* * * * *

UNITED STATES PATENT AND TRADEMARK OFFICE
CERTIFICATE OF CORRECTION

PATENT NO. : 5,721,624
DATED : February 24, 1998
INVENTOR(S) : KUMASHIRO et al

It is certified that error appears in the above-indentified patent and that said Letters Patent is hereby corrected as shown below:

On the title page, item [36]:
Foreign Application Priority Data, delete "Oct. 15, 1989" and insert --Oct. 15, 1993--.

Signed and Sealed this

Eleventh Day of August 1998

Attest:

BRUCE LEHMAN

*Attesting Officer*          *Commissioner of Patents and Trademarks*